United States Patent
Dimitri et al.

(10) Patent No.: US 9,191,992 B2
(45) Date of Patent: Nov. 17, 2015

(54) SYSTEM AND METHOD FOR PARTICIPANTS DATA RETRIEVAL POST ACCIDENT OR EVENT

(71) Applicant: International Business Machines Corporation, Armonk, NY (US)

(72) Inventors: Jennifer L. Dimitri, Fishkill, NY (US); Wilfredo Ferre, Le Mesnil le Roi (FR); Peter K. Malkin, Yorktown Heights, NY (US); Marc P. Yvon, Antony (FR)

(73) Assignee: INTERNTAIONAL BUSINESS MACHINES CORPORATION, Armonk, NY (US)

( * ) Notice: Subject to any disclaimer, the term of this patent is extended or adjusted under 35 U.S.C. 154(b) by 13 days.

(21) Appl. No.: 14/039,607

(22) Filed: Sep. 27, 2013

(65) Prior Publication Data

US 2015/0094013 A1    Apr. 2, 2015

(51) Int. Cl.
| | |
|---|---|
| H04M 11/04 | (2006.01) |
| H04W 88/06 | (2009.01) |
| G01S 5/00 | (2006.01) |
| G06F 17/30 | (2006.01) |
| G08G 1/00 | (2006.01) |
| H04M 1/00 | (2006.01) |
| H04W 4/00 | (2009.01) |

(Continued)

(52) U.S. Cl.
CPC .......... *H04W 88/06* (2013.01); *G01S 5/00* (2013.01); *G06F 17/30* (2013.01); *G08G 1/00* (2013.01); *H04M 1/00* (2013.01); *H04W 4/008* (2013.01); *H04W 4/02* (2013.01); *H04W 8/00* (2013.01); *H04W 4/046* (2013.01); *H04W 4/22* (2013.01)

(58) Field of Classification Search
USPC .............. 455/404.2, 414.2; 340/436, 903
See application file for complete search history.

(56) References Cited

U.S. PATENT DOCUMENTS

| | | | |
|---|---|---|---|
| 5,446,659 | A | 8/1995 | Yamawaki |
| 6,166,656 | A | 12/2000 | Okada et al. |

(Continued)

FOREIGN PATENT DOCUMENTS

EP    1280681    3/2004

OTHER PUBLICATIONS

Kalasapur et al., "Service Oriented Pervasive Computing for Emergency Response Systems," Proceedings of the Fourth Annual IEEE International Conference on Pervasive Computing and Communications Workshops, 2006.

(Continued)

*Primary Examiner* — David Q Nguyen
(74) *Attorney, Agent, or Firm* — Janice Kwon; Michael A. Petrocelli (57) ABSTRACT

A device and method for post event data retrieval uses an electronic communications system, wherein the method and system can utilize a detection device for detecting the event and facilitating the post event data retrieval. The system and method include detecting an event using a detection device. The detection device includes a location tool configured to determine a position of the detection device. The detection device defines a specified vicinity with respect to itself. A location is determined of the detection device using the location tool, after the event has occurred. Data including an identification (ID) is automatically requested of a communications device in the specified vicinity, using the detection device. A reply is received by the detection device which includes the ID from the communications device for identifying the communications device.

19 Claims, 5 Drawing Sheets

(51) Int. Cl.
*H04W 4/02* (2009.01)
*H04W 8/00* (2009.01)
*H04W 4/04* (2009.01)
*H04W 4/22* (2009.01)

(56) References Cited

U.S. PATENT DOCUMENTS

| | | | |
|---|---|---|---|
| 6,246,933 | B1 | 6/2001 | Bagué |
| 6,650,359 | B1 | 11/2003 | Park |
| 6,850,843 | B2 | 2/2005 | Smith et al. |
| 7,224,956 | B1 | 5/2007 | O'Neil |
| 8,121,753 | B2 | 2/2012 | Bauchot et al. |
| 2005/0037730 | A1 | 2/2005 | Montague |
| 2007/0285512 | A1* | 12/2007 | Kitani et al. .................. 348/148 |
| 2008/0161996 | A1 | 7/2008 | Chang et al. |
| 2008/0242261 | A1* | 10/2008 | Shimanuki et al. ........ 455/404.2 |
| 2008/0252485 | A1 | 10/2008 | Lagassey |
| 2009/0156182 | A1* | 6/2009 | Jenkins et al. ............. 455/414.2 |

OTHER PUBLICATIONS

Antuan Goodwin, CNET Reviews, "Camera with GBS logger could help collect crash data," Jul. 23, 2008, http://reviews.cnet.com/8301-13746_7-9998211-48.html, Accessed on Jul. 26, 2003.

"Laser Car Crash Camera—1280×720, HD720p at 30fps, . . . Built-In Microphone—Black", http://www.techbuy.com.au/p/188497/Laser/NAVCAM-HD-.asp, Accessed on Jul. 26, 2013.

Products—GPS Car Accident Camera, http://www.alibaba.com/showroom/gps-car-accident-camera.html, accessed on Jul. 26, 2013.

* cited by examiner

SYSTEM AND METHOD FOR PARTICIPANTS DATA RETRIEVAL POST ACCIDENT OR EVENT

BACKGROUND

1. Field

The present disclosure relates to a method and system for post event data retrieval using an electronic communications system, and more particularly, the method and system can utilize a detection device for detecting the event and facilitating the post event data retrieval.

2. Background of the Disclosure

Systems and devices for detecting events, such as a vehicle detecting a traffic accident, can detect an event, and transmit a signal. For example, a vehicle event detection system can detect that the vehicle has been in an accident, and automatically contact emergency personnel, or send an emergency message. Such techniques and devices may include sounding an alarm or signaling people in the proximity of the event. A detection device may include one or more sensors for detecting an event, such as a traffic accident, and provide a signal as discussed above.

BRIEF SUMMARY

There is a need for a device and system to provide data retrieval after an event which includes identifying a communications device in the vicinity of the event.

In an embodiment according to the invention, a method for post event data retrieval using an electronic communications system includes the steps of detecting an event using a detection device. The detection device includes a location tool configured to determine a position of the detection device, and the detection device defines a specified vicinity with respect to itself. A location of the detection device is determined using the location tool, after the event has occurred. The method further includes automatically requesting data including an identification (ID) of a communications device in the specified vicinity, using the detection device, and receiving a reply including the ID from the communications device at the detection device for identifying the communications device.

In another aspect of the invention, a detection device for post event data retrieval uses an electronic communications system. A detection mechanism is configured to detect an event using a detection device. The detection device includes a location tool being configured to determine a location of the detection device. The detection mechanism defines a specified vicinity with respect to itself, and the location is determined during a specified time proximity to an occurrence of the event. A transceiver is configured to automatically requesting data including an identification (ID) of a communications device in the specified vicinity. The transceiver is configured to receive a reply including the ID from the communications device for identifying the communications device.

In another aspect of the invention, a vehicle includes a mechanism for post event data communication using an electronic communications system. A first detection mechanism in a first vehicle is configured to detect an event using a first detection device. The first detection device includes a first location tool being configured to determine a first location of the first detection device. The first detection mechanism defines a first specified vicinity with respect to itself, and the first location is determined during a specified time proximity to an occurrence of the event. A first transceiver in the first detection device is configured to automatically request data including an identification (ID) from second detection devices in the first specified vicinity. The second detection devices each include second transceivers, the second detection devices being part of each of a plurality of second vehicles, respectively. The first transceiver is configured to receive replies from the second transceivers, including IDs from the second detection devices for identifying the second detection devices.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
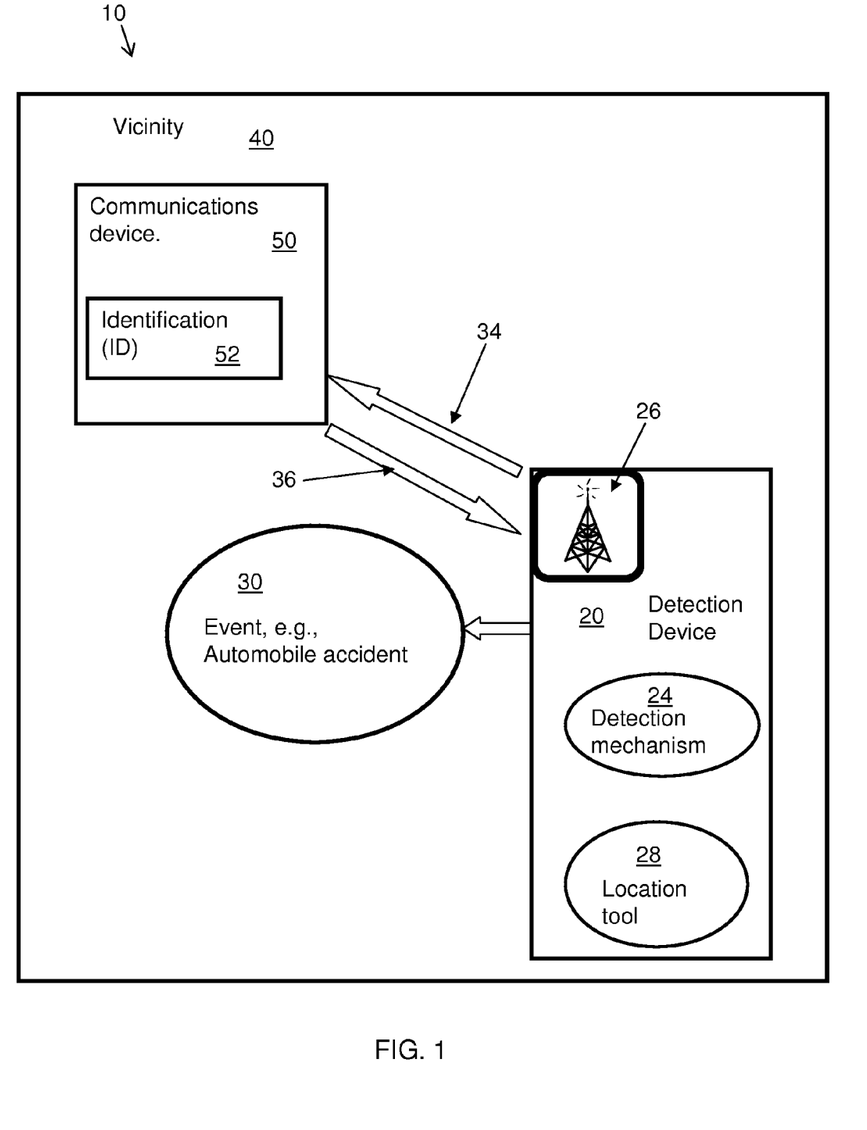
FIG. 1 is a schematic block diagram illustrating an overview of the system and methodology for detecting an event and sending and receiving communications from a device in the vicinity of the event, according to an embodiment of the disclosure.
Figure 2:
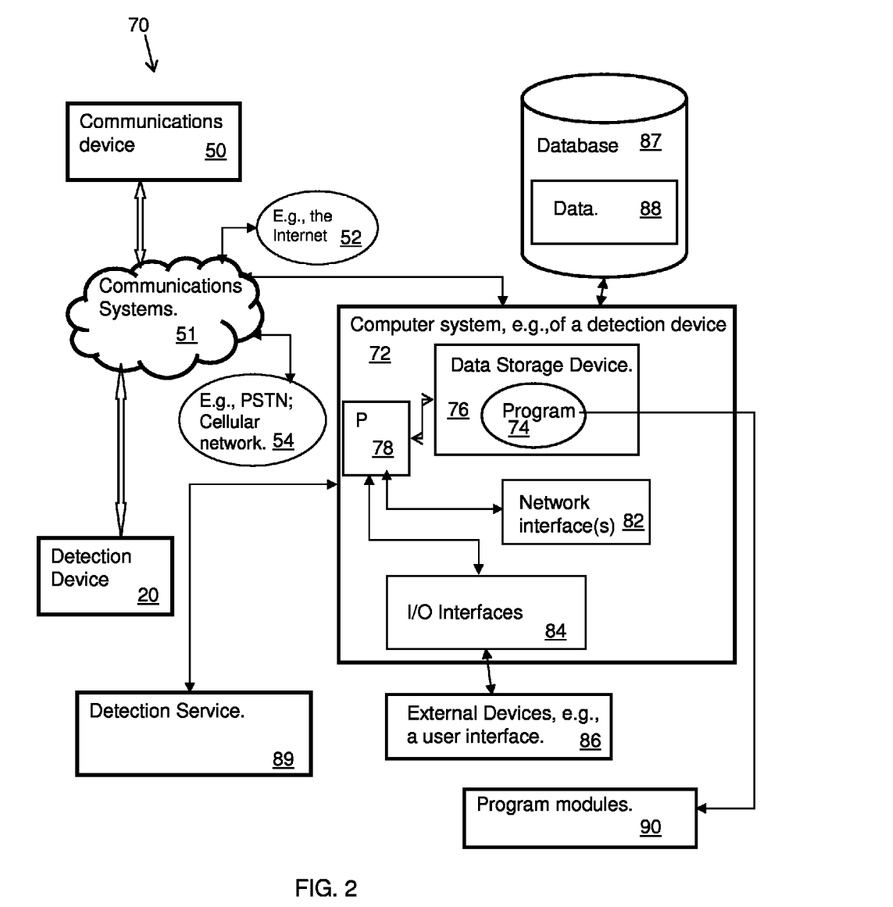
FIG. 2 is a schematic block diagram illustrating a computer system of the detection device shown in FIG. 1, according to an embodiment of the disclosure.

Referring to FIGS. 1 and 2, a system 10 and a method 100 for retrieving post event data using an electronic communications system, according to an embodiment of the invention are described below. Step 104 includes detecting an event 30 using a detection device 20. The event 30 can be something that activated or triggers the detection device 20. The event can include an auto accident, something entering a predefined area, or a motion detected by the detection device. The detection device 20 can be installed in an automobile, a hand held device, or be part of a hand held device, or installed at a location, for instance in a building or on an outer wall of a building.

The detection device 20 includes a detection mechanism 24 for detecting when an event occurs. For example, the detection mechanism 24 may be an infrared light which detects motion in an area. In another example, the detection mechanism may detect a sudden impact. The detection device also includes a transceiver 26, as an embodiment of a communications mechanism, for broadcasting a signal and receiving a reply signal. The detection device 20 is configured to determine its position or location using a location tool 28, which can be accomplished using a number of locating techniques. For example, the position of the detection device 20 can be ascertained using a global positioning system (GPS). Other techniques for broadcasting a request may include RF (radio frequency) or WiFi (i.e., wirelessly communicating using radio waves). Applications running on nearby devices can respond, for example, using an ID (human-owner's ID (e.g., a Social Security number (SSN)), device ID (e.g., a MAC address (Media Access Control Address)), or a unique automobile/vehicle ID (e.g., VIN number (Vehicle Identification number)), in addition to a GPS-determined location.

The detection device 20 defines a specified vicinity 40 with respect to itself. The vicinity 40 can be defined by a range of detection of the detection device, or the range of the detection device to send a request to communication devices. For example, the range of the transceiver 26 to send and receive a communications signal, can determine the vicinity with respect to the detection device. Optionally, the range of the transceiver to send and receive signals, and the range of detection from the detection device, can be considered in combination when determining the vicinity 40. In another instance, the vicinity can also be defined by considering the area which a potential witness to an event has visibility.

Referring to FIG. 2, the detection device 20 may communicate with one or more communication devices 50 using a communications mechanism embodied as a communications system 51, which can include, for example: the Internet 52, or a public switched telephone network (PSTN) for example, a cellular network 54. The PSTN may include telephone lines, fiber optic cables, microwave transmission links, cellular networks, and communications satellites.

Further, referring to FIG. 2, a system 70 depicts an exemplary embodiment of a computer system 72 which is a generic computer system that can be representative of a computer in the detection device. The computer system 72 can also represent the communication device, and/or a server having a database providing the method of the present disclosure as a service (e.g., a detection service 89). The service 89 may use a server embodied as the computer system 72 which include a database 87 for storing data 88. The computer system 72 can communicate with the communications device 50 using the communications system 51, which can be embodied, for example, as the Internet 52 or a PSTN 54, as discussed above. The method 100 may be embodied in a program 74 embodied on a computer readable storage device, e.g., data storage device 76, and which is executable by a processor 78 of the computer 72 (i.e., execute program steps, code, or program code). The program or executable instructions therefrom, may be offered as a service 89 by a provider. The program may be an add-on or sub-program to an existing program, such as an addition to a website providing shopping recommendations. The program may also be stored and run locally on a user device. The computer 72 and program 74 shown in FIG. 2 are generic representations of a computer and program that may be local to a user, or provided as a remote service, such as a website accessible using the Internet. The computer 72 also generically represents a computer device such as a personal data assistant, a laptop, or desktop computer, etc., or part of one or more servers, alone or as part of a datacenter. The computer system 72 can include a network interface 82, and input/output (I/O) interface(s) 84. The I/O interface 84 allows for input and output of data with an external device 86 that may be connected to the computing device. The network interface 82 may provide communications between the computing device and a computer network. The program 74 may include program modules 90 for executing specific steps, routines, sub-routines, instructions or code, of the program. Such modules 90 are generically represented in FIG. 4, and discussed below in more detail.

Figure 3:
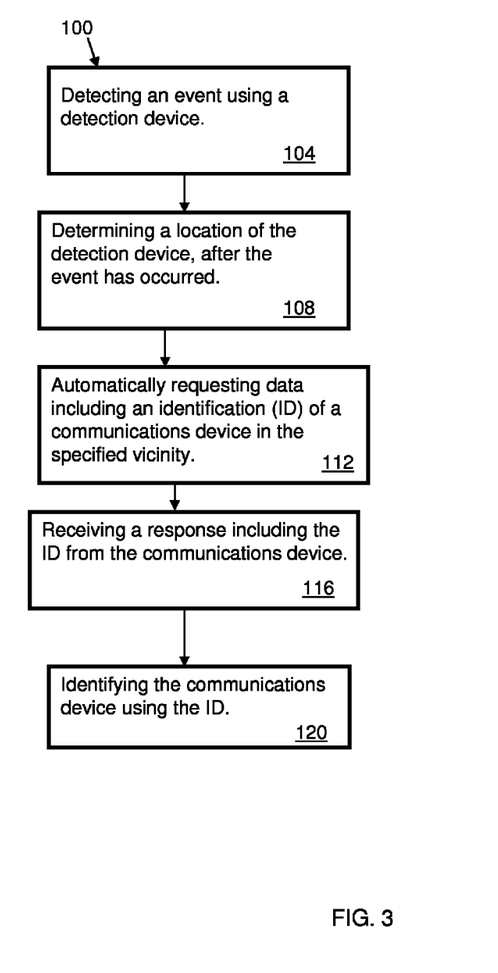
FIG. 3 is a flow chart illustrating a method for detecting an event using the system shown in FIGS. 1 and 2, according to an embodiment of the disclosure.

Referring to FIG. 3, step 108 includes determining a location of the detection device 20. The location can be determined during a specified time proximity to an occurrence of the event. For example, before or after the event. Further, the location determination may be acceptable if the location was determined right before the occurrence of the event, for example, 3-5 minutes before. If a suitable time proximity to the event occurrence is not available, a location can be determined immediately after the event has occurred, for instance, including a few seconds after the event occurrence to a few minutes.

The location of the detection device 20 can be ascertained and monitored before the event as a routine measure of the detection device. However, since the location of the detection device as related to the event can provide a time stamp and location of the event, a location determination immediately after the event, or right before the event, if such a location determination was ascertained, can provide useful data relating to the event, such as, a time stamp and a location. The locating technique used by the location tool can include determining the location of the detection device by a GPS, before or after the event. For example, after an accident is detected by the detection mechanism 24, the location tool 28 can determine the location of the detection device. Ascertaining the location of the detection device can give a location of the event, at the same location. The location tool 28 can include recording the date and the time of the event.

A location of the event can also be approximated where there are multiple detection devices by noting which detection device has been activated, having a range for the detection capabilities of the detection device, and using the above to determine a location of the event within the vicinity 40. In some instances, the detection device may be located in a house, or building, or outside a building, an event can be located by determining the range and position of the detection device to determine an approximate location of the event within the vicinity 40. The detection device can thereby detect an event within its vicinity using a sensor at its location or a plurality of sensors in the vicinity, and collecting data from the sensors.

The system and method according to the present disclosure can determine the time and date using the detection device in addition to receiving data from surrounding communications devices. The location of the detection device can include, e.g., latitude, longitude and elevation, speed, acceleration and orientation, and such data, if available, can additionally be requested from the surrounding communications devices in the vicinity.

Step 112 includes automatically requesting data including an identification (ID) 52 of a communications device 50 in the specified vicinity 40. The data may include, for example, an ID, a telephone number for a cellular device, any identifying information, and time and location information for the communications device.

The communications device (or a plurality thereof) can be part of one or more inanimate objects, for example, a security system, a vehicle (such as part of a navigation system), part of road construction equipment, normal traffic control equipment such as stop signs and traffic lights, or even street signs. If the communications device has access to or includes a recording device, a photo or video can be supplied as data. Further examples of data that can be supplied include orientation, speed and location of one or more other vehicles from communications devices in those vehicles. For instance, this data can be used to recreate a traffic accident.

The detection device 20 can use its transceiver 26 to request 34 the ID 52. The request to the communications device can include the transceiver 26 sending a broadcast transmission to any communications devices in the vicinity 40, for example, communications device 50. There may be a plurality of communication devices in the vicinity 40. The reply 36 can be transmitted by the communications device 50. The ID can include a code for a mobile device, or a static IP (Internet Protocol) address for a desktop computer. The ID can further include a Vehicle Identification Number (VIN), or a cell phone telephone number of a cell phone or a personal data assistant (PDA). The request can be made using a wireless technology (which may be part of a wireless technology standard such as Bluetooth, which was standardized as IEEE (The Institute of Electrical and Electronics Engineers) 802.15.1) wherein other devices on the same wireless technology can communicate and exchange information. The vicinity 40 may be a specified area, such as, a radial distance from the detection device, for instance, about one half mile from the detection device.

Additionally, an automatic search of communications devices in the vicinity can be initiated by the detection device. Then, a request for the ID can be sent to detected devices in the vicinity. The communication devices can include, for example, a computer, or Personal Data Assistant (PDA), a cell phone, a notebook, or the like Step 116 includes receiving a reply including the ID from one or more communications devices. The communications devices can be, for example, an onboard computer in a car, or a mobile device.

Step 120 includes indentifying the communications device using the ID. As discussed above, the ID, such as a VIN number of a car, can place the car in the vicinity of the event. Thus, a potential witness to the event may be available, or the perpetrator of the event, who could have previously gone unknown, now becomes identifiable.

In an embodiment of the disclosure, an ID of a communications device can be used to generate a name of a person owning the device based on the communications device ID. The person can be a person of interest, for example, a witness to the event. The event can include an auto accident, something entering a predefined area, or a motion detected by the detection device.

Thereby, the present disclosure includes the method 100 for post event data retrieval which uses an electronic communications system for detecting the event 30 using the detection device 20. The detection device 20 includes the location tool 28 for determining a position or location of itself. The detection device defines the specified vicinity 40 with respect to itself. The method includes determining a location of the detection device 20, which may be a specified time proximity to the event occurrence. The request 34 is automatically generated for data including the identification (ID) 52 of the communications device in the specified vicinity 40. The detection device 20 can then receive the reply 36, including the ID, from the communications device 50. The transceiver 26 can be configured to automatically request the identification (ID) of a communications device in the specified vicinity 40. The transceiver is configured to receive a reply including the ID from the communications device for identifying the communications device.

Figure 4:
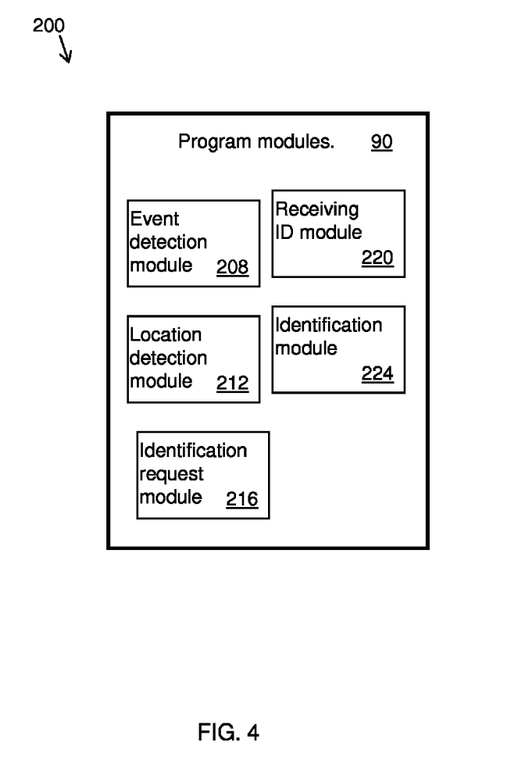
FIG. 4 is a detailed block diagram of the program modules shown in FIG. 2, according to an embodiment of the disclosure.

Referring to FIG. 4, in another example according to the disclosure, a module block diagram 200 depicts modules 90 of the program 74. An event detection module 208 includes detecting an event using the detection device. A location detection module can determine a location of the detection device. An identification request module 216 can automatically request an identification (ID) of the communications device in the specified vicinity. A receiving ID module 220 can receive a reply including the ID from the communications device. An identification module 224 can identify the communications device sending the reply for identifying the communications device.

In another embodiment of the disclosure, wherein like elements are referred to with the same reference numerals as in the embodiments described above, the detection device 20 includes a program 74 as shown in FIG. 2. A user program, (which could be the same as the program 74 or a complimentary software program (e.g., a user version)) can be installed and running on one or more detection devices in the specified vicinity 40. Thus, the detection devices, which would include a computing system, can be installed in a plurality of inanimate objects other than a vehicle. In one example, the user program can be installed in multiple vehicles so that when a first vehicle is struck by a second vehicle, the first vehicle records the time, location, and impact area, orientation and speed of the first vehicle, and sends a broadcast to other communications devices. The second vehicle responds to the broadcast by sending the time, location, impact area of the second vehicle, and an orientation and speed of the second vehicle. The information enhances the accident investigation by supplying basic information such as time and date, but also the information for analysis to ascertain, fault, witnesses, weather conditions related to the time and date, etc.

In other examples, the user program can also be installed on a plurality of other devices, such as, cars, phones, radios, street barriers, street signs, toll plaza gates, construction barriers, and street lights. Thus, for example, after an event such as a vehicle accident, the first car can not only determine its own location, orientation, speed and time/date of the accident, but could also request (query) all surrounding objects (including vehicles) in the vicinity which are also running the program (that is, the user program in this embodiment), to determine an ID, location, orientation and speed from other vehicles, and request information from any other objects running the user program. Other valuable information provided can include whether an object running the program was struck in the accident, or construction was in the area, or a traffic light can indicate the signal of the traffic light (that is, red, yellow or green) at the time of the request.

Figure 5:
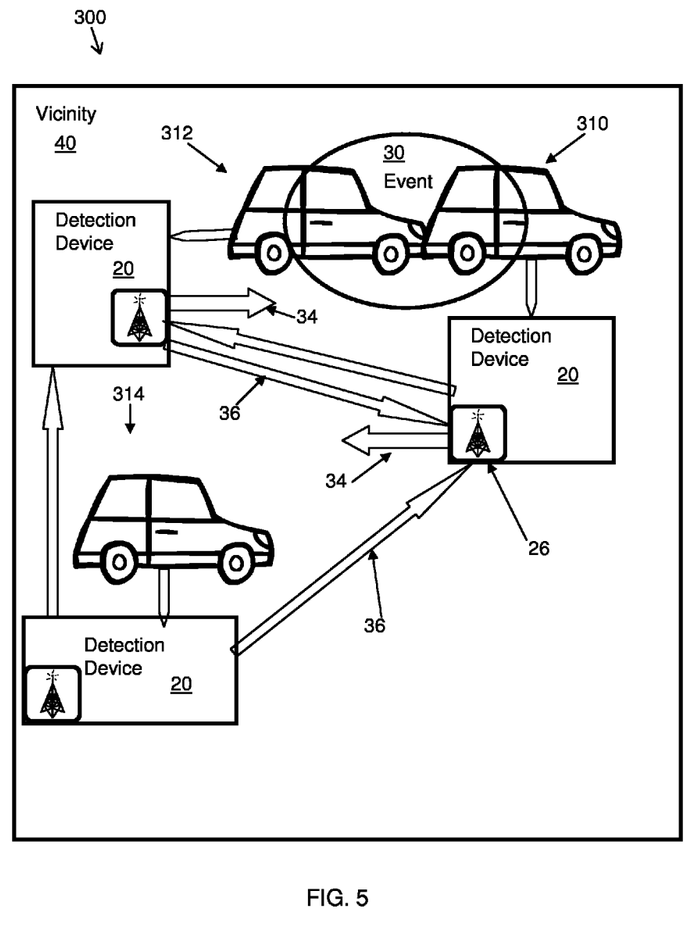
FIG. 5 is a schematic block diagram illustrating a technique for detecting an event and sending and receiving communications from devices in the vicinity of the event, according to another embodiment of the disclosure.

Referring to FIG. 5, in other example according to the method 100 (depicted in FIG. 3), wherein similar elements have the same reference numerals of the system 10 (shown in FIG. 1), a first vehicle 310 is in a traffic accident 30 (which is an embodiment of an event) with a second vehicle 312. A third vehicle 314 is in the vicinity 40 of the accident/event 30. The first, second, and third vehicles 310, 312, 314 include detection devices 20. The detection devices 20 can include the user program, as discussed above, allowing the first, second, and third vehicles to communicate with each other. The first, second, and third vehicles can each send a broadcast message, that is, a request, and/or receive a reply from one or more of the other vehicles.

In the example shown in FIG. 5, the first vehicle 310 detects an event 30 and sends a broadcast signal/message embodied as a request 34 to other vehicles in the vicinity 40, in this example, second vehicle 312 and the third vehicle 314. The second vehicle 312 also detects the event 30, that is, the accident between the first and second vehicles 310 and 312, and also sends a broadcast signal/message embodied as a request 34 to the other vehicles, the first and third vehicles 310, 314. The detection devices 20 of all the vehicles 310, 312, 314 send replies 36 to the other vehicles detection devices 20, respectively. The replies include an ID for the vehicles which may include a VIN number as discussed above in previous examples, and a location and time of event time stamps. Thus, the first and second vehicles 310, 312, exchange information, and the third vehicle 314 provides information to the first and second vehicles. The information can be useful in an accident investigation and for locating witnesses to the event/accident. In an alternative embodiment the third vehicle 314 can also collect information from the first and second vehicles 310, 312.

In another example using FIG. 5, if only the first vehicle 310 was involved in an accident, that is, a single car accident, for example, hitting a wall, or a roll over, the detection device having detected the event/accident involving the first vehicle 310 sends out a broadcast signal/message embodied as the request 34. The detection devices of the second and third vehicles, 312, 314, send replies 36 to the detection device 20 of the first vehicle 310. The replies include an ID for the second and third vehicles. The replies can provide useful information about the time of the accident, and the location of the second and third vehicles to aid in an investigation of the accident.

While embodiments of the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

Therefore, one or more Figures described herein may illustrate a schematic of an embodiment of the disclosure and may include a representative computer system or processing system that may implement a method and a program in one or more embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with one or more processing systems in the present disclosure may include, but are not limited to, personal computer systems, server computer systems, handheld or laptop devices, multi-processor systems, microprocessor-based systems, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. Computer system may include a variety of computer system readable media. Such media may be any available media that is accessible by computer system, and it may include both volatile and non-volatile media, removable and non-removable media. System memory 58, shown in FIG. 1, can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces. Additionally, computer systems can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Additionally, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Further, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams as may be illustrated in the one or more Figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A method for post event data retrieval using an electronic communications system, comprising the steps of:
    detecting an event using a detection device, the detection device including a location tool being configured to determine a position of the detection device, and the detection device defining a specified vicinity with respect to itself;
    determining a location of the detection device using the location tool, the location being determined during a specified time proximity to an occurrence of the event;
    automatically requesting data including an identification (ID) from a communications device in the specified vicinity, after the event has occurred, using the detection device being within the specified vicinity;
    receiving a reply at the detection device, the reply including the ID from the communications device for identifying the communications device; and
    automatically searching, using the detection device, for one or more communications devices in the specified vicinity of the event, before the step of automatically requesting data;
    wherein the communications device receives the automatic request for data, and the communications device sends the reply to the detection device.

2. The method of claim 1, further comprising:
    approximating a location of the communications device.

3. The method of claim 1, wherein the detection device determines a location of the event based on the location of the detection device, and determines a time of the event.

4. The method of claim 1, wherein the step of automatically requesting an ID includes using a broadcast transmission.

5. The method of claim 1, wherein the ID includes: a static Internet address, a Vehicle Identification Number (VIN), or a cell phone telephone number.

6. The method of claim 1, wherein the step of automatically requesting an ID includes using a wireless technology standard.

7. The method of claim 1, wherein the reply includes a location of the communications device.

8. The method of claim 1, further comprising:
    generating a name of a person owning the communications device based on the ID.

9. The method of claim 1, wherein the detection device is part of an automobile, and the event is an automobile accident.

10. The method of claim 1, wherein the detection device is a mobile device.

11. The method of claim 1, wherein a plurality of communications devices receive the automatic request for data, and the communications devices each send a respective reply to the detection device.

12. The method of claim 1, wherein the detection device includes a communications mechanism which uses: an Internet, a public switched telephone network (PSTN), or a radio signal.

13. The method of claim 1, wherein the location of the detection device is determined using a Global Positioning System (GPS).

14. A detection device for post event data retrieval using an electronic communications system, which comprises:
    a detection mechanism being configured to detect an event using a detection device, the detection device including a location tool being configured to determine a location of the detection device, the detection mechanism defining a specified vicinity with respect to itself, the location being determined during a specified time proximity to an occurrence of the event; and
    a transceiver being configured to automatically request data including an identification (ID) of a communications device in the specified vicinity when the transceiver is in the specified vicinity and the occurrence of the event has been detected by the detection mechanism, the detection device being configured to automatically search for one or more communications devices in the specified vicinity of the event, before the automatic request of data, and the transceiver being configured to receive a reply including the ID from the communications device for identifying the communications device.

15. The device of claim 14, wherein the detection device is part of an automobile, and the event is an automobile accident.

16. The device of claim 14, wherein the detection device is a mobile device.

17. The device of claim 14, wherein the transceiver automatically requests the ID and the request includes using a broadcast transmission.

18. The device of claim 14, wherein the detection device includes a communications mechanism which uses: an Internet, a public switched telephone network (PSTN), a radio signal.

19. A vehicle including a mechanism for post event data communication using an electronic communications system, which comprises:
    a first detection mechanism in a first vehicle being configured to detect an event using a first detection device, the first detection device including a first location tool being configured to determine a first location of the first detection device, the first detection mechanism defining a first specified vicinity with respect to itself, the first location being determined during a specified time proximity to an occurrence of the event; and
    a first transceiver in the first detection device being configured to automatically request data including an identification (ID) from second detection devices in the first specified vicinity when the first transceiver is in the first specified vicinity and the occurrence of the event has been detected by the first detection mechanism, the first detection device being configured to automatically search for the second detection devices in the first specified vicinity of the event, before the automatic request of data, the second detection devices include second transceivers, the second detection devices being part of each of a plurality of second vehicles, respectively, the first transceiver being configured to receive replies from the second transceivers, including IDs from the second detection devices for identifying the second detection devices.

\* \* \* \* \*